United States Patent [19]

Miyata et al.

[11] Patent Number: 5,061,887
[45] Date of Patent: Oct. 29, 1991

[54] MACHINING DATA DISPLAY SYSTEM

[75] Inventors: Mitsuto Miyata, Hachioji; Hidehiro Miyajima, Yamanashi, both of Japan

[73] Assignee: Fanuc, Ltd., Minamitsuru, Japan

[21] Appl. No.: 469,471

[22] PCT Filed: Jul. 26, 1989

[86] PCT No.: PCT/JP89/00774

§ 371 Date: Mar. 30, 1990

§ 102(e) Date: Mar. 30, 1990

[87] PCT Pub. No.: WO90/01735

PCT Pub. Date: Feb. 22, 1990

[30] Foreign Application Priority Data

Aug. 3, 1988 [JP] Japan ............................ 63-193690

[51] Int. Cl.$^5$ ............................................. G05B 23/02
[52] U.S. Cl. ........................... 318/568.25; 318/567; 364/474.22
[58] Field of Search ............ 318/568.25, 568.24, 318/567; 364/474.16, 474.17, 474.18, 474.19, 474.2, 474.22

[56] References Cited

U.S. PATENT DOCUMENTS

| | | | |
|---|---|---|---|
| 4,456,960 | 6/1984 | Wakai | 364/474.17 |
| 4,556,833 | 12/1985 | Kishi et al. | 318/567 |
| 4,591,989 | 5/1986 | Tanaka | 364/474.18 |
| 4,680,697 | 7/1987 | Kiya et al. | 318/568.25 |
| 4,700,313 | 10/1987 | Takajawa | 364/474.2 |
| 4,922,440 | 5/1990 | Kawamura | 364/474.22 |

Primary Examiner—William M. Shoop, Jr.
Assistant Examiner—Saul M. Bergmann
Attorney, Agent, or Firm—Staas & Halsey

[57] ABSTRACT

Disclosed is a machining data display system for displaying data at a display of a numerical control apparatus (CNC) while a machining operation is being carried out, wherein machining data (11) to (14) specified by a machining program are selected from machining data registered in advance and displayed at the display (10). With this arrangement, machining data actually required is displayed and machining conditions are correctly monitored.

4 Claims, 6 Drawing Sheets

| | | |
|---|---|---|
| TOOL NUMBER | 3 | X 25.00 |
| TOOL NAME | DRILLING | Y 144.00 |
| MACHINING PROCESS | ROUGH MACHINING | Z -20.00 |
| MESSAGE | COOLANT | F 10.00 |
| | | S 500 |
| | | T 3 |

11 — TOOL NUMBER
12 — TOOL NAME
13 — MACHINING PROCESS
14 — MESSAGE
10 — (screen)

Fig. 1

| #6971 | TOOL NUMBER |
|---|---|
| #6972 | TOOL NAME |
| #6973 | MACHINING PROCESS |
| #6974 | MESSAGE |

Fig. 2

MACHINING DATA DISPLAY SYSTEM

TECHNICAL FIELD

The present invention relates to a machining data display system for displaying data at a display of a numerical control apparatus (CNC) while a machining operation is being carried out, and more specifically, to a machining data display system by which machining data is selectively displayed.

BACKGROUND ART

A numerical control apparatus (CNC) is linked to a machine tool and constitutes a numerically controlled machine tool (NC machine tool), by which a complex curve or curved surface can be machined in an automatic operation mode by preprogramming a machining process. Nevertheless, the machining conditions must be constantly monitored, since an error in the machining program, damage to a tool or the like may occur even in the automatic operation. For this purpose, there is conventionally employed a machining data display system by which specific data is displayed at a display of a numerical control apparatus, to notify an operator of machining conditions. The content of the data displayed by this conventional machining data display system, however, is only the minimum data necessary for the control of a machine tool (positional data, feed speed, r.p.m. of a spindle, T code etc.) and the amount of data that can be displayed in addition to the above is limited.

Nevertheless, a wide variety of machine tools are coupled with a numerical control apparatus, and each machine tool has different specifications, machining data displayed at a display must conform with the specifications of the machine tool.

SUMMARY OF THE INVENTION

Taking the above into consideration, an object of the present invention is to provide a machining data display system capable of selectively displaying machining data inherent to a machine tool.

To solve the above problem, in accordance with the present invention, there is provided a machining data display system for displaying data at a display of a numerical control apparatus (CNC) while a machining operation is being carried out, the system comprising selecting machining data specified by a machining program from machining data registered in advance, and displaying the selected machining data at the display.

Namely, arbitrary machining data is registered in advance and the machining is carried out while each one block of a machining program is decoded and it is determined whether a command to display machining data has been output. When a command to display the machining data has been output, the stored machining data is displayed at a display in accordance with the output command.

BRIEF DESCRIPTION OF THE DRAWINGS

FIG. 1 is a display of a machining data display system of an embodiment according to the present invention;

FIG. 2 is a diagram illustrating a correspondence between machining data and system variables of an embodiment according to the present invention;

DESCRIPTION OF THE PREFERRED EMBODIMENT

An embodiment of the present invention will be described below with reference to drawings.

Figure 4:
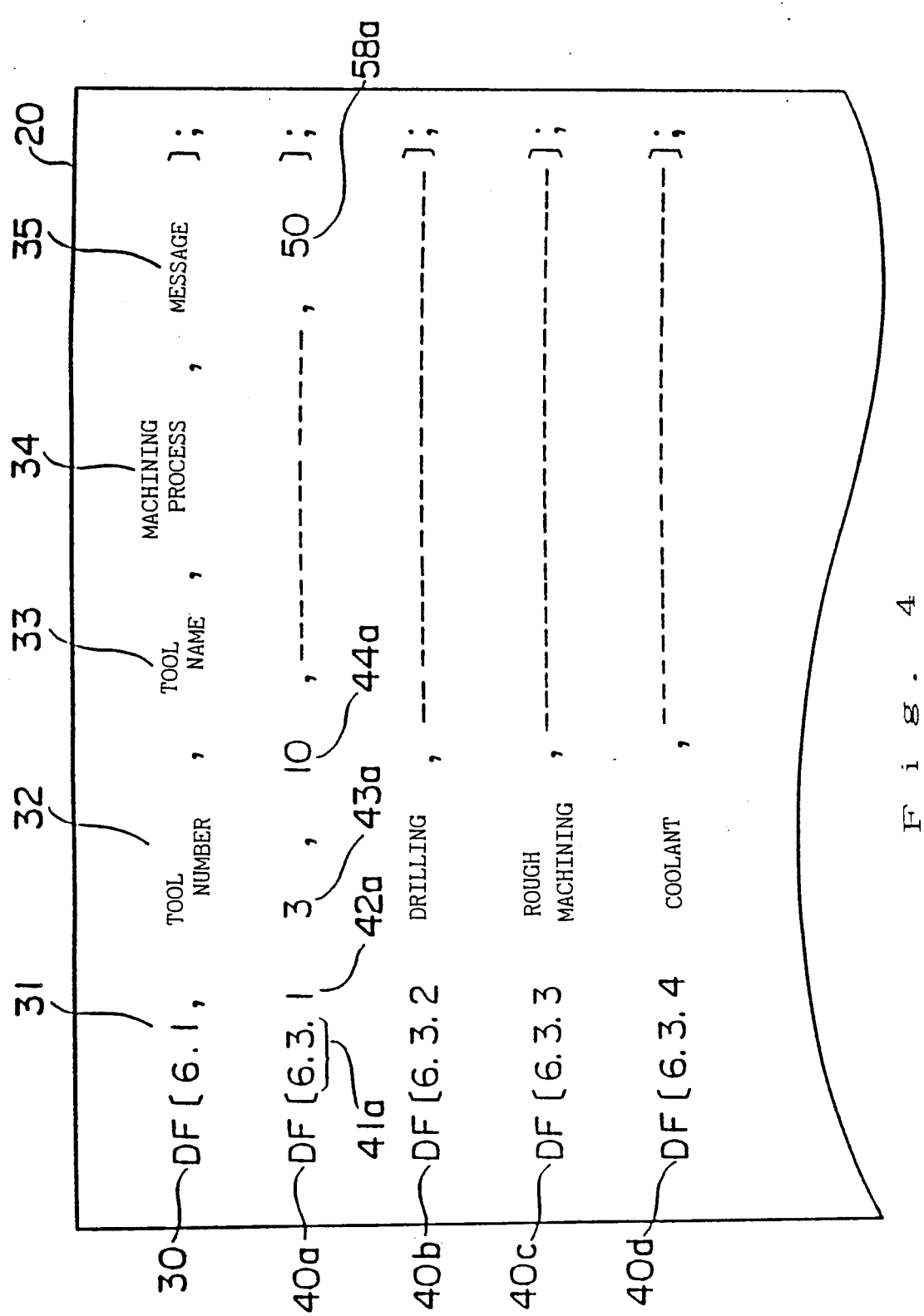
FIG. 4 is a diagram illustrating a machining data definition command of an embodiment according to the present invention.

FIG. 4 is a diagram illustrating a machining data definition command of a machining data display system of an embodiment of the present invention, wherein 20 designates a machining program; 30 designates a definition command for defining names of machining data, up to four names of the machining data being defined by this command, as described below; 31 designates a numeral value which is the definition command for the name of the machining data; 32 to 35 designate names of the machining data to be defined. Although the names of the machining data can be arbitrarily set, in this embodiment, 32 defines "tool number", 33 defines "tool name", 34 defines "machining process" and 35 defines "message".

Numerals 40a to 40d designate definition commands for defining a display character train of the machining data. These definition commands will be described in detail with reference to the definition command 40a as an example. Numeral 41a designates a numeral value indicating that it is a definition command for a display character train, and 42a designates a numeral value indicating a name of the machining data corresponding to a figure, this numeral value being based on the sequence of the names of the machining data defined by the definition command 30. Therefore, "1" indicates that the definition command 40a is a command to define the machining data of the "tool number" 32. Numerals 43a to 58a designate a character train to be actually displayed as machining data, up to sixteen display character trains of the machining data being defined. Note that the characters used as the display character train include alphanumeric characters, KANJI, HIRAGANA and KATAKANA. Here, "3" is defined at 43a, "10" is defined at 44b, ... "50" is defined at 58a as a character train of the machining data classified as "tool number" 32.

Similarly, 40b designates a definition command for a tool name, 40c designates a definition command for a machining process, and 40d designates a definition command for other messages. In addition, "drilling", "rough machining" and "coolant" are defined at the first position in the display character train for each item.

The names of the machining data and the display character trains for each name defined as described above are read in a numerical control apparatus by a machining program. The numerical control apparatus stores the read names of the machining data in correspondence with system variables. Therefore, only a numeral value which selects a system variable and a display character train corresponding to the name of the machining data need be instructed. A numeral value selecting a display character train represents a sequence of each display character train defined in the definition command of the display character train. More specifically, in the case of the definition command 40a, "3" of 43a represents "1" and "10" of 44a represents "2".

FIG. 2 is a diagram illustrating a correspondence between the machining data and the system variables, wherein "#6971 to #6974" represent the system variables. In the present invention, "#6971" is a system variable corresponding to "tool number" based on the definition command of the names of the machining data. Similarly, "#6972", "#6973" and "#6974:" are system variables corresponding to "tool name", "machining process" and "message", respectively.

Figure 3:
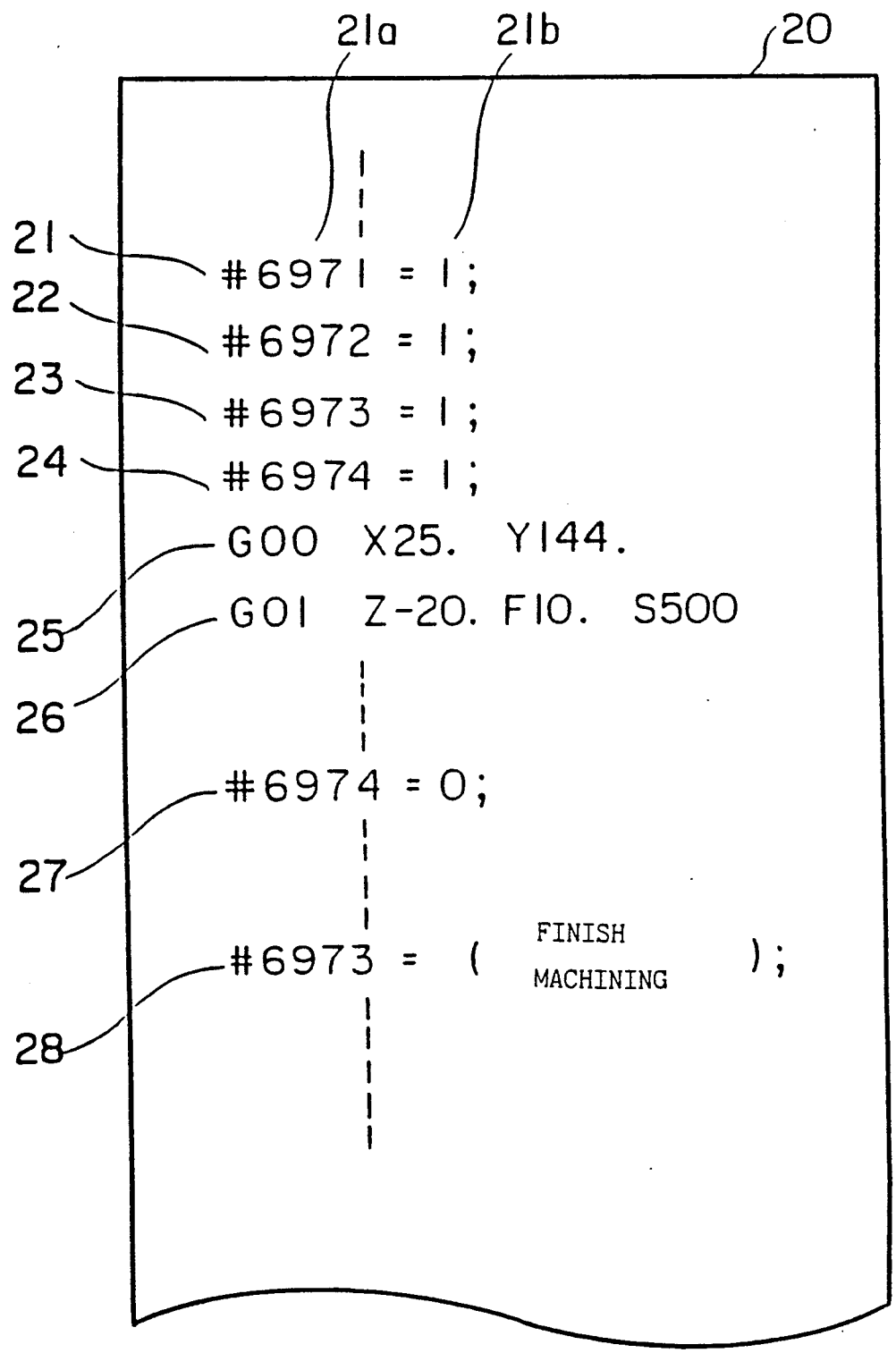
FIG. 3 is a machining program of an embodiment according to the present invention.

FIG. 3 is a machining program of an embodiment of the present invention, wherein 20 designates a machining program, 21 to 24 designate a machining data display command, and 25 and 26 designate a machining execution command. To describe the content of the machining command 21, "#6971" of 21a is a command indicating an item of "tool number", and "1" of 21b is a numeral value for selecting a display character train as described above, and thus it is indicated that this is a display command for "tool number" 3. Note that, when the numeral value for selecting a display character train is set to "0", it functions to delete machining data from a display.

Similarly, machining data commands 22, 23 and 24 indicate "drilling", "rough machining" and "coolant", respectively.

FIG. 1 shows a display by a display unit when the blocks in the range of the machining data command 21—machining execution command 26 of the machining program in FIG. 3 are executed, wherein 10 designates the display in which "3" is displayed at the location of 11, and thus an operator can confirm that the tool number of a tool used at present is 3. Similarly, "drilling", "rough machining" and "coolant" are displayed at the locations of 12, 13 and 14, respectively and thus can be confirmed by the operator.

Returning to FIG. 3, commands 27 and 28 will be described. Since the machining data command 27 has a numeral value for selecting a display character train set to "0", it is used to delete items of machining data displayed corresponding to the system variable "6974" from the display. Therefore, when the command of this block is executed, the indication of "coolant", hitherto displayed, is deleted from the display.

The machining data command 28 enables the indication of "finish machining" to be displayed at the display in place of the indication of "rough machining" of the machining data corresponding to the system variable "#6973".

Figure 5:
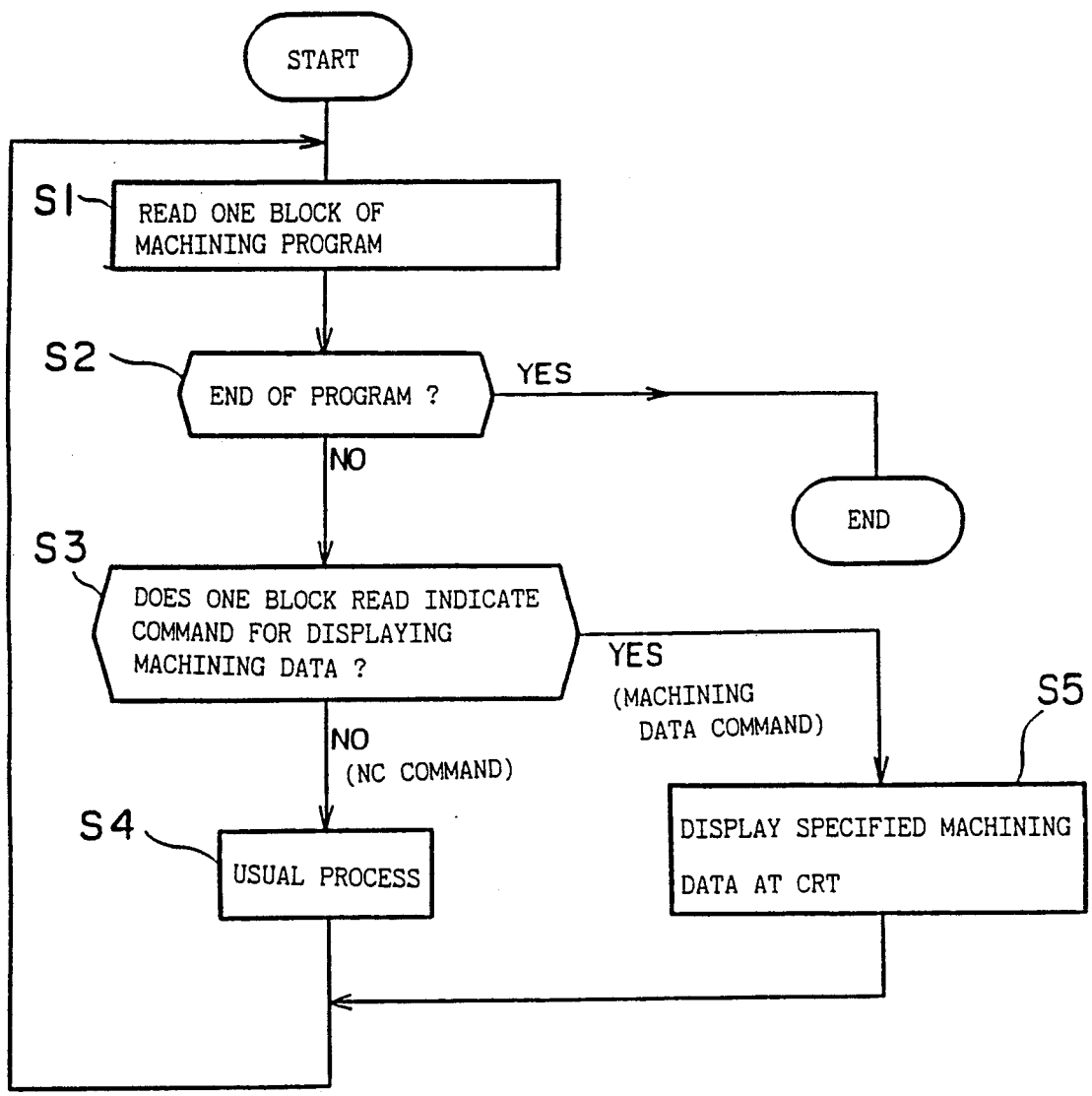
FIG. 5 is a flowchart of a process of a numerical control apparatus of an embodiment according to the present invention.

FIG. 5 is a flowchart of a process of a numerical control apparatus in a machining data display system of an embodiment of the present invention, wherein numerals prefixed with an "S" indicate the numbers of the steps of the process. One command block of a machining program is read at step S1 and then it is determined whether the machining program has ended at S2. When the machining program has ended, the flow is ended, and when the program has not ended, the flow goes to step S3, at which it is determined whether the read command is a machining data display command. When the read command is a machining data display command, the flow goes to step S5, and when the read command is a command other than the machining command display command, the flow goes to S4. At step S4, a usual process is executed according to the read command, and at step S5, specified machining data is displayed at the display.

Figure 6:
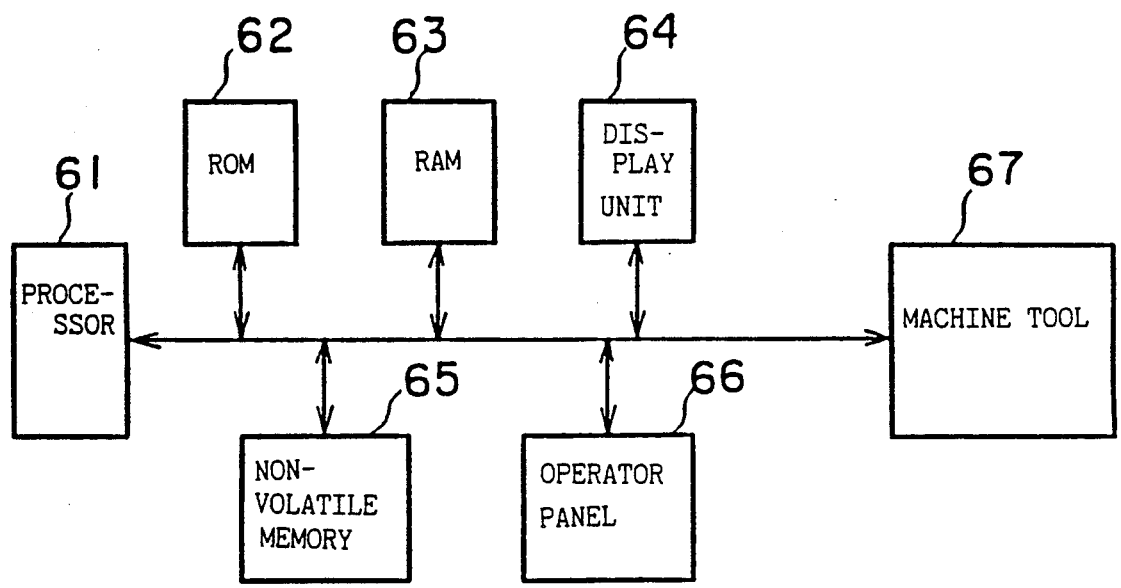
FIG. 6 is a diagram of a hardware arrangement of a numerical control apparatus as an embodiment of the present invention.

FIG. 6 is a diagram of a hardware arrangement of a numerical control apparatus as a machining data display system according to the present invention, wherein 61 designates a processor for globally controlling the system; 62 designates a ROM in which a control program for controlling the numerical control apparatus is stored; 63 designates a RAM; 64 designates a display unit at which machining data is displayed; 65 designates a non-volatile memory in which a machining program is stored; 66 designates an operator console; and 67 designates a machine tool.

Note that, although the displayed content of the machining data is defined by the machining data defining command of the machining program in the present invention, it is possible to prestore a plurality of machining data in the numerical control apparatus by a key input through a CRT/MDI unit, select the machining data based on a machining data display command of the machining program, and display that data at a display in addition to the above.

Further, it is also possible to define machining data by the machining program regardless of the machining data prestored as described above, and select and display necessary data from both machining data by the machining data display command.

As described above, according to the present invention, since machining data specified by the machining program is selected from machining data registered in advance and displayed at a display, actual machining conditions can be correctly monitored, and further, the machining program can be readily checked.

We claim:

1. A machining data display method for displaying data at a display of a numerical control apparatus (CNC) while a machining operation is being carried out, comprising the steps of:

defining a set of names of machining data to be displayed;

defining definition commands, each being associated with a selected one of the names of machining programs, and including a display train;

selecting one of the names of machining data;

selecting one of the definition commands; and displaying said selected machining data at the display.

2. A machining data display method according to claim 1, further comprising the step of prestoring the machining data by said machining program.

3. A machining data display method according to claim 1, further comprising the step of prestoring the machining data by a key input through a CRT/MDI unit.

4. A machining data display method according to claim 1, further comprising the step of prestoring the machining data by said machining program and said key input through a CRT/MDI unit.

* * * * *